G. F. JOHNSON.
SEED PLANTER.
APPLICATION FILED DEC. 28, 1917.
1,344,764.
Patented June 29, 1920.
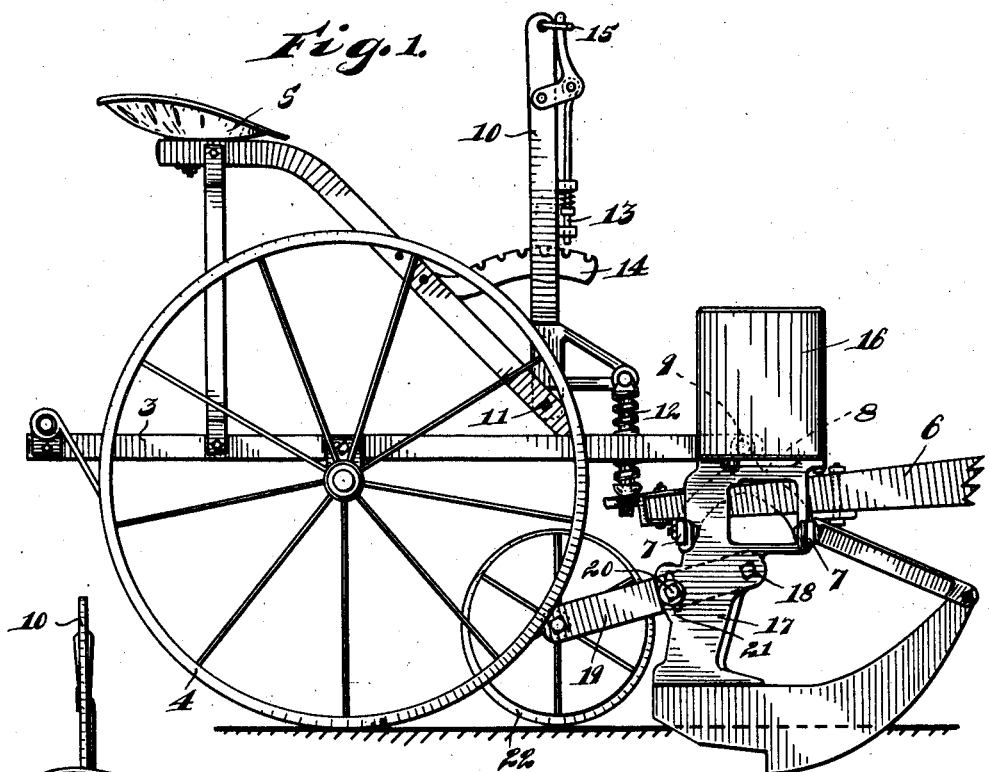
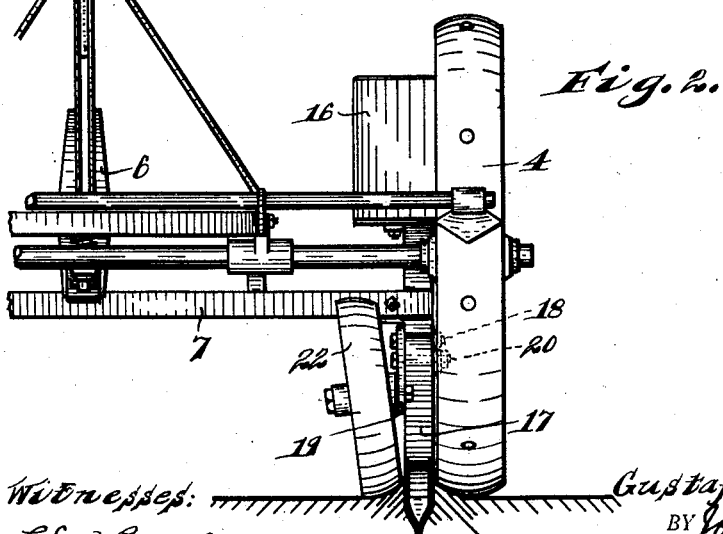
Witnesses:
C. E. Wessels.
A. A. Olson.
INVENTOR.
Gustaf Felix Johnson,
BY Joshua R. H. Potts
his ATTORNEY.

UNITED STATES PATENT OFFICE.

GUSTAF FELIX JOHNSON, OF CHICAGO, ILLINOIS.

SEED-PLANTER.

1,344,764.   Specification of Letters Patent.   Patented June 29, 1920.

Application filed December 28, 1917. Serial No. 209,234.

*To all whom it may concern:*

Be it known that I, GUSTAF FELIX JOHNSON, a citizen of the United States, and a resident of the city of Chicago, county of Cook, and State of Illinois, have invented certain new and useful Improvements in Seed-Planters, of which the following is a specification.

My invention relates to improvements in seed planters and has for its object the production of improved means for gaging the depth of the cut of the furrow opener of a seed planter and for closing and packing the sides of the furrow formed.

A further object is the production of improvements in seed planters, as mentioned, which will be of durable and economical construction and highly efficient in use.

The invention consists in the combinations and arrangements of parts hereinafter described and claimed.

The invention will be best understood by reference to the accompanying drawings forming a part of this specification, and in which, Figure 1 is a side elevation of a seed planter embodying the invention, and Fig. 2, a rear elevation of one side of the planter.

The preferred form of construction as illustrated in the drawings comprises a frame 3 which is pivotally supported intermediate its ends upon traction wheels 4. Upon said frame is mounted a driver's or operator's seat 5. Projecting from the front end of the frame 3 is a draft tongue 6, the rearward end of which is rigidly connected with a pair of transversely extending spaced parallel bars 7. Said bars 7 are rigidly connected by yokes 8 which in turn are pivotally connected at 9 with the front end of the frame 3. This is an old and well known construction, being of the type in which a floating pivotal connection is established between the front end of the frame of the planter and the rearward end of the draft tongue thereof. This connection between the frame and draft tongue is controlled by a manually operable lever 10, fulcrumed at 11, said lever being operatively connected with the rearward end of the draft tongue by a connecting link or rod 12. The arrangement is such, as will be seen, that through pivotal adjustment of lever 10, the connection between the frame and draft tongue may be raised or lowered to any vertical position desired. The parts may be locked in any position of adjustment by a spring pressed pawl 13 provided on lever 10, which coöperates with a toothed segment 14. A loop or keeper 15 is provided at the upper end of lever 10 which is adapted to engage over the upper end of the presser member which operates pawl 13 for holding said pawl in inoperative or disengaged position, as seen in Fig. 1. When said pawl is thus held, the connection between the front end of the planter frame and the draft tongue is free, being adapted to "float" as is generally understood.

Mounted upon the bars 7 at each side of the machine, is a seed dropping mechanism 16 and below the same a coöperating runner furrow opener 17. Fulcrumed at 18 to the furrow opener is a rearwardly projecting arm 19 which is adapted for pivotal movement in a vertical plane, the same being locked in positions of adjustment by means of a bolt 20 which engages in an elongated arcuate slot 21 formed in the furrow opener. Carried at the rearward end of arm 19 is wheel 22 which is adapted to contact with the ground and gage or determine the depth of the cut formed by the furrow opener, when the machine is in use. In order to permit of this function being served by the wheel 22, the pawl 13 is disengaged so as to permit of free vertical movement of the joint or connection between the frame and the draft tongue, as before described, since, in this case, the weight of the front end of the frame, the rearward end of the draft tongue and the associated parts will be borne by the wheels 22.

Said wheels 22 are arranged in close proximity with the furrow opener so that the same will not be affected by uneven ground, said wheels being adapted to follow the curvature or irregularity of the ground and thus result in the formation of a furrow of uniform depth, notwithstanding the uneven contour of the ground. The depth of the cut may of course be adjusted by simply pivotally adjusting the arm 19 coöperating with each wheel 22. Each wheel 22 and the adjacent draft wheel 4 are laterally spaced at opposite sides of the operative path of the furrow opener, so that said wheels will travel along opposite sides of the furrow formed, as clearly seen in Fig. 2, serving as means of closing the furrow and packing the soil at opposite sides thereof. To better adapt said wheels to serve the latter function, the same are of convex formation, the latter form being also desirable, inasmuch as the same may be manufactured at a comparatively low cost, as compared with wheels generally used on agricultural machinery. Also the wheel 22 is preferably held at an inclination, that is inclined away from the furrow, in order to better adapt the same to press the soil toward the furrow in closing the same and in packing the ground at the sides thereof.

When it is not desired to employ the wheels 22, the same may be removed, in which event the gaging of the depth of the furrow will be determined by the draft wheels 4. When this is done, however, the pawl 13 must be engaged with the rack 14 in order to rigidly connect the frame and draft tongue.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A seed planter comprising a frame; a traction wheel supporting said frame; a seed dropping mechanism; a furrow opener arranged for free vertical movement; and a wheel interposed between said traction wheel and said furrow opener adapted to contact with the ground and gage the depth of the cut by said furrow opener, said second mentioned wheel and said traction wheel being laterally spaced at opposite sides of the operative path of said furrow opener and having convex peripheries, substantially as described.

In testimony whereof I have signed my name to this specification in the presence of two subscribing witnesses.

GUSTAF FELIX JOHNSON.

Witnesses:
 SAMUEL T. STEWART,
 A. B. BUGELIM.